(12) United States Patent
Yamazaki et al.

(10) Patent No.: US 8,876,158 B2
(45) Date of Patent: Nov. 4, 2014

(54) AIR BAG APPARATUS

(71) Applicant: Daicel Corporation, Osaka (JP)

(72) Inventors: Masayuki Yamazaki, Tatsuno (JP);
Masayuki Ueda, Tokyo (JP)

(73) Assignee: Daicel Corporation, Osaka-Shi (JP)

( * ) Notice: Subject to any disclaimer, the term of this patent is extended or adjusted under 35 U.S.C. 154(b) by 0 days.

(21) Appl. No.: 13/916,235

(22) Filed: Jun. 12, 2013

(65) Prior Publication Data

US 2013/0334800 A1    Dec. 19, 2013

Related U.S. Application Data

(60) Provisional application No. 61/659,352, filed on Jun. 13, 2012.

(30) Foreign Application Priority Data

Jun. 13, 2012  (JP) ................. 2012-134018

(51) Int. Cl.
| | |
|---|---|
| *B60R 21/16* | (2006.01) |
| *B60R 21/263* | (2011.01) |
| *B60R 21/217* | (2011.01) |
| *B60R 21/261* | (2011.01) |

(52) U.S. Cl.
CPC ............. *B60R 21/263* (2013.01); *B60R 21/217* (2013.01); *B60R 21/261* (2013.01); *B60R 2021/2612* (2013.01)
USPC ........... 280/736; 280/739; 280/740; 280/741; 280/742

(58) Field of Classification Search
USPC .................. 280/732, 736, 739, 740, 741, 742
See application file for complete search history.

(56) References Cited

U.S. PATENT DOCUMENTS

| | | | |
|---|---|---|---|
| 5,370,416 A | 12/1994 | Hamada | |
| 5,639,112 A * | 6/1997 | Phillion et al. | ............. 280/728.2 |
| 5,658,010 A * | 8/1997 | Steffens et al. | ............... 280/731 |

(Continued)

FOREIGN PATENT DOCUMENTS

| | | |
|---|---|---|
| JP | 05-262196 A | 10/1993 |
| JP | 10-315900 A | 12/1998 |

(Continued)

OTHER PUBLICATIONS

International Search Report issued in International Application No. PCT/JP2013/065776 on Sep. 10, 2013.

*Primary Examiner* — Toan To
(74) *Attorney, Agent, or Firm* — Birch, Stewart, Kolasch & Birch, LLP

(57) ABSTRACT

An air bag apparatus includes: a base plate, two gas generators, a cover member covering the two gas generators so as to form a gap, an air bag accommodated in contact with the base plate, a hollow formed in the base plate and provided with a communication hole, the hollow accommodating the two gas generators such that a space is provided between two gas generators and another gap, for communicating with the communication hole, is formed, the air bag accommodated such that a gas inlet thereof enclose the communication hole from the other side of the base plate, the air bag, the base plate and the cover member being integrally fixed, and a sealed gas discharge path formed by the cover member and the base member, and leading from the gas discharge port of the two gas generators to the gas inlet of the air bag.

7 Claims, 5 Drawing Sheets

(56) References Cited

U.S. PATENT DOCUMENTS

| | | | |
|---|---|---|---|
| 5,934,705 A * | 8/1999 | Siddiqui et al. | 280/736 |
| 6,095,561 A | 8/2000 | Siddiqui et al. | |
| 6,106,009 A | 8/2000 | Katsuda et al. | |
| 6,142,519 A * | 11/2000 | Smith | 280/741 |
| 6,435,548 B2 * | 8/2002 | Suzuki et al. | 280/732 |
| 6,474,684 B1 * | 11/2002 | Ludwig et al. | 280/741 |
| 6,659,500 B2 * | 12/2003 | Whang et al. | 280/741 |
| 6,997,477 B2 * | 2/2006 | Quioc | 280/741 |
| 7,168,734 B2 * | 1/2007 | Katsuda | 280/730.2 |
| 7,275,760 B2 * | 10/2007 | Quioc et al. | 280/736 |
| 7,438,313 B2 * | 10/2008 | Bilbrey et al. | 280/737 |
| 2003/0141703 A1 | 7/2003 | Fowler et al. | |

FOREIGN PATENT DOCUMENTS

| | | |
|---|---|---|
| JP | 2000-344039 A | 12/2000 |
| JP | 2001-277979 A | 10/2001 |
| JP | 2001-294112 A | 10/2001 |
| JP | 2003-226220 A | 8/2003 |

* cited by examiner

AIR BAG APPARATUS

This nonprovisional application claims priority under 35 U.S.C. §119(a) to Patent Application No. 2012-134018 filed in Japan on 13 Jun. 2012 and 35 U.S.C. §119(e) to U.S. Provisional application No. 61/659,352 filed on 13 Jun. 2012, which are incorporated by reference.

BACKGROUND OF INVENTION

1. Filed of Invention

The present invention relates to an air bag apparatus having a gas generator.

2. Description of the Related Art

An air bag apparatus for vehicles is a device for protecting passengers or the like at the time of collision by inflating an air bag with gas generated by a gas generator.

In some cases, to adjust deployment of the air bag at the time of collision, a dual-type gas generator having a plurality of igniters for independent combustion chambers is used.

For example, in a pyrotechnic gas generator using a solid gas generating agent as a gas source for producing an inflating gas for an air bag, a dual-type structure can be obtained only with one gas generator unit, thereby making the handling easy, but making an internal structure complicated.

Meanwhile, a single-type gas generator includes a single ignition device and a single combustion chamber corresponding to the igniter. There is a known air bag system in which a plurality of such single-type gas generators are assembled in an air bag module and that exhibits the same deployment performance as a module having a dual-type gas generator.

In an inflator 10 in U.S. Pat. No. 6,095,561, igniters 50 and 52 are attached to one ends of a respective cylindrical gas generators formed by two housings 12 and 14. The opposite ends of the gas generators are faced with each other and connected via an insulating tube 20.

The insulating tube 20 has heat-radiating orifices 21, and when one of the gas generators is activated, heat of the activated gas generator is prevented from being conducted to the other gas generator. The gas generators are assembled into the air bag module in this state.

SUMMARY OF INVENTION

A first aspect of the present invention provides an air bag apparatus including:
a base plate, two gas generators, a first gas generator and a second gas generator, fixed to one side of the base plate;
a cover member covering the two gas generators from the same side as the one side of the base plate;
an air bag accommodated in contact with the base plate;
a hollow or a recess, formed in the one side of the base plate and provided with a communication hole,
the two gas generators being arranged in the hollow with a space therebetween, such that a gap, for communicating with the communication hole, is formed between the hollow and a gas discharge port of the respective gas generators,
the cover member covering the two gas generators such as to form a gap between the cover member and the gas discharge port of the respective gas generators,
the air bag accommodated such that a gas inlet thereof encloses the communication hole in the hollow from the other side of the base plate,
the air bag, the base plate and the cover member being integrally fixed by fastening, with a fastening member, the base plate, the cover member and a frame shaped air bag attachment member which is arranged to abut against the gas inlet in an inside of the airbag,
the two gas generators being fixed by the hollow of the base plate and the cover member, and
a sealed gas discharge path formed by the cover member and the base plate, and leading from each gas discharge port of the two gas generators to the gas inlet of the air bag.

A second aspect of the invention provides another air bag apparatus including:
a base plate having an opening;
two gas generators;
a cover member covering the two gas generators;
an air bag accommodated in contact with the base plate;
a retainer for retaining the air bag and a gas generator,
the retainer including a flat plate portion and a hollow formed in one side of the flat plate portion, the hollow provided with a plurality of communication holes,
the two gas generators being arranged, with a space therebetween, inside the opening of the base plate and in the hollow of the retainer, and having a gap for communicating with a communication hole between the hollow and a gas discharge port of the respective gas generators,
the cover member covering the two gas generators such as to form a gap between the cover member and the gas discharge port of the respective gas generators,
as to the air bag, the retainer, the base plate and the cover member,
the retainer being inserted into the air bag from an gas inlet of the air bag, and disposed such that the flat plate portion abuts against the gas inlet in an inside of the airbag,
the retainer, the air bag, the base plate and the cover member being integrally fixed by a fastening member,
the two gas generators being fixed by the hollow of the retainer, the opening of the base plate and the cover member,
a sealed gas discharge path formed by the cover member, the base plate and the retainer, and leading from the gas discharge port of a plurality of gas generators to the gas inlet of the air bag.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF INVENTION

Figure 1:
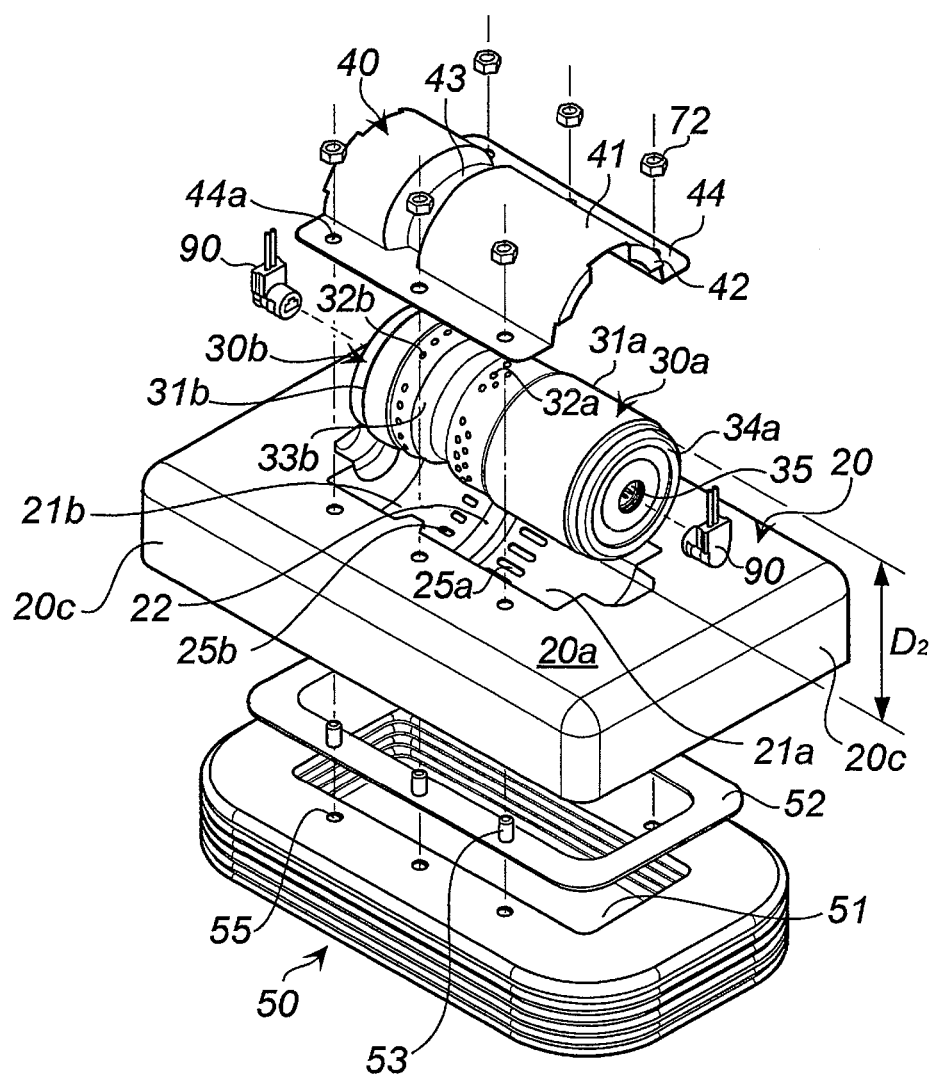
FIG. 1 is an exploded perspective view of an air bag apparatus (perspective view for explaining how the apparatus is assembled)

The present invention provides an air bag apparatus that has a simple structure and is easily assembled.

The present invention provides an air bag apparatus with a simplified structure.

Two gas generators, a first gas generator and a second gas generator, are fitted in a hollow of a base plate and covered with a cover member from above. The cover member and the base plate form a sealed gas discharge path leading from a gas discharge port of the two gas generators to an air bag.

The air bag apparatus of the present invention is made by a combination of a base plate, two gas generators, a cover member and an air bag.

The base plate has a hollow. The part of the base plate other than the hollow is preferably flat, but may also be curved.

The base plate may have a side wall for each side. For example, if the base plate is quadrangular, it may have a side wall on one side, or two side walls on adjacent two sides, or two side walls on opposite two sides, or three side walls on three sides, or four side walls on four sides. The base plate may have a shape other than a quadrangle, such as a circle. In this case, the base plate may have an annular side wall therearound.

The side wall of the base plate may be extended in the same direction as the protruding direction of the hollow, or in the opposite direction from the protruding direction of the hollow.

A base plate that includes four side walls on each side extending in the same direction has a shape analogous to a box (with no lid).

The air bag is accommodated to be in contact with the base plate in a folded state. If the base plate has a side wall as mentioned above, the air bag may be accommodated in contact with the side wall.

The two gas generators are fitted in the hollow on one side (the first surface) of the base plate and covered with the cover member from above.

The air bag, the base plate, and the cover member are assembled by fastening means (such as a combination of a bolt and a nut) with the use of an air bag attachment member in the shape of a frame.

In the air bag apparatus of the present invention, a shape and a size of each component are designed to match a shape and a size of the two gas generators, so that the two gas generators are fixed by the hollow in the base plate and the cover member. A gas discharge path, which leads from the gas discharge ports of each of the two gas generators to a gas inlet of the air bag, is obtained.

The two gas generators used in the air bag apparatus of the present invention may be a pyrotechnic type that generates gas by combustion of a solid gas generating agent charged inside a housing, or may be a stored type that uses compressed gas filled inside a housing, or may be a hybrid type that combines both of these. A pyrotechnic gas generator is preferable in view of a compact size and light weight. Two gas generators that have different maximum outputs may be combined.

In the first aspect of the invention, it is preferable that each of the two gas generators has a columnar outer shape and a plurality of gas discharge ports in an annular region on a circumferential surface near one end surface, and the circumferential surface in the annular region provided with the gas discharge ports has a smaller outer diameter than that of circumferential surfaces of the remaining portion, the two gas generators are disposed in the hollow of the base plate with the space therebetween, such that the end surfaces, on the side where the plurality of gas discharge ports are provided, face each other, the base plate, the two gas generators, and the cover member are disposed such that an annular gap is formed between the circumferential surface of the annular region provided with the gas discharge ports and an inner surface of the cover member, and between the circumferential surface of the annular region provided with the gas discharge ports and a surface of the hollow of the base plate, and the annular gap communicates with the communication hole formed in the hollow of the base plate, thereby forming the gas discharge path.

In the air bag apparatus, a gas discharge path is formed that leads from the gas discharge ports in each of the two gas generators to the gas inlet of the air bag via the annular gap and the communication hole formed in the hollow of the base plate.

The gas discharge ports in each of the two gas generators and the communication hole formed in the hollow of the base plate are communicated with each other via the annular gap. Even so, the gas discharge ports and the communication hole are preferably opposite each other so as to achieve reliable gas discharge through the gas discharge path.

The two gas generators may be arranged coaxially and spaced longitudinally apart from each other. Or, the two gas generators may be arranged to juxtapose to each other, and with a space therebetween. The longitudinal arrangement is more preferable.

In the first aspect of the invention, it is preferable that
the space between the end surfaces of the two gas generators has a distance of 0.1 to 2 times an outer diameter of the gas generators.

The two gas generators are arranged with a space therebetween, with a distance as specified above between the opposing end surfaces. This space prevents the activation of one gas generator from affecting the other gas generator. In the case with pyrotechnic gas generators, for example, which generate inflation gas by combustion of a gas generating agent, the space serves as a thermal insulation layer for preventing the other gas generator from malfunctioning due to heat conduction from one activated gas generator.

If the two gas generators have different outer diameters, the size of the space is determined based on the gas generator having the larger outer diameter. Preferably, the space distance may be 0.3 to 1 times the outer diameter, or more preferably, 0.5 to 0.8 times the outer diameter.

In the first aspect of the invention, it is preferable that the air bag apparatus further includes
at least one of a protrusion protruding in the hollow of the base plate and a protrusion protruding from the inner surface of the cover member,
the protrusion being positioned in the space between the two gas generators and abutted against the two gas generators.

The protrusion may be provided to one or both of the base plate and the cover member, so that the space between the two gas generators is maintained. Thus, the protrusion prevents the two gas generators from displacing or contacting each other due to deformation of the opposing end surfaces during activation. With a pyrotechnic gas generator, in particular, when one of the gas generators is activated, the other gas generator is prevented from being thermally affected.

Another example of the protrusion may be a plurality of independent protrusion formed circumferentially, or a continuous annular projection.

In the first aspect of the invention, it is preferable that the air bag apparatus further includes
at least one of a protrusion protruding in the hollow of the base plate and a protrusion protruding from the inner surface of the cover member,
the protrusion being wider in a bottom side than in a top side thereof,
the protrusion being positioned in the space between the two gas generators and abutted against the two gas generators, and
the annular regions of the two gas generators, or the annular gaps thereof being communicated with each other.

The two annular gaps of the two gas generators and the space between the two gas generators are communicated with each other. More in details a first annular gap of the first gas generator and a second annular gap of the second gas generator are communicated with each other through the space between the two gas generators.

The combustion gas flows from each of the gas-discharging ports to the gas inlet of the air bag, through each of the annular gaps, the space between the two gas generators and the communication holes of the hollows of the base plate, which corresponds to the sealed gas discharge path formed by the cover member, the base plate and the gas generators.

In the case of the protrusion having a larger width in the bottom side (in the side of the hollow of the base plate or in the side of the inner surface of the cover member) than a width in the top side, the space between the gas generators are maintained by the bottom of the protrusion in contact with the gas generators. In this state, there is a gap between the inclined surfaces from the bottom to the top of the protrusion and the gas generators.

A widthwise cross-section of such a protrusion may be in a shape of, for example, a triangle, a trapezoid or other similar (substantive triangular or trapezoidal) shape. Each side (surface) of the triangle or trapezoid need not necessarily be linear, but may be curved (curved surface).

When the gas generator is activated, the housing deforms due to increase of the internal pressure within the housing so as to bulge from a central part of a surface.

With the two gas generators having a columnar outer shape and arranged with a space therebetween such that the end surfaces in the vicinity of the plurality of gas discharge ports are opposite to each other, the end surfaces bulge out from the central part by increase of the internal pressure of the gas generators.

With the protrusion having the shape described above, the inclined surfaces do not contact the deformed gas generator housing (the opposing end surfaces of the housings), so that narrowing or blocking of the gas discharge path due to displacement of the gas generators can be prevented.

The air bag apparatus of the second aspect of the present invention is formed by a combination of the base plate, the two gas generators, the cover member, the air bag, and the retainer for retaining the air bag and the gas generators.

The base plate has the opening. The part of the base plate other than the opening is preferably flat, but may also be curved.

The base plate may have a side wall for each side. For example, if the base plate is quadrangular, it may have a side wall on one side, or two side walls on adjacent two sides, or two side walls on opposite two sides, or three side walls on three sides, or four side walls on four sides. The base plate may have a shape other than a quadrangle, such as a circle. In this case, the base plate may have an annular side wall therearound.

The side wall of the base plate may be extended in the same direction as the protruding direction of the hollow, or in the opposite direction from the protruding direction of the hollow.

A base plate that includes four side walls on each side extending in the same direction has a shape analogous to a box (with no lid).

The air bag is accommodated so as to be in contact with the base plate in a folded state. If the base plate has a side wall as described above, the air bag may be accommodated in contact with the side wall.

The two gas generators are disposed in an accommodation space formed by a combination of the base plate and the retainer and covered with the cover member from above.

The air bag, the base plate, the cover member and the retainer are assembled by fastening member (such as a combination of a bolt and a nut).

And, a shape and a size of each component are designed to match a shape and a size of the two gas generators, so that the two gas generators are fixed by the base plate, the retainer and the cover member. A gas discharge path, which leads from the gas discharge ports of each of the two gas generators to a gas inlet of the air bag, is obtained. Two gas generators having different maximum outputs may be used in combination.

The air bag apparatus of the present invention has a simplified overall structure and facilitates assembling.

As there is no need to couple or connect two gas generators beforehand but they need only be put together with other components, the apparatus can be assembled with a fewer number of steps and lower production cost.

Figure 2:
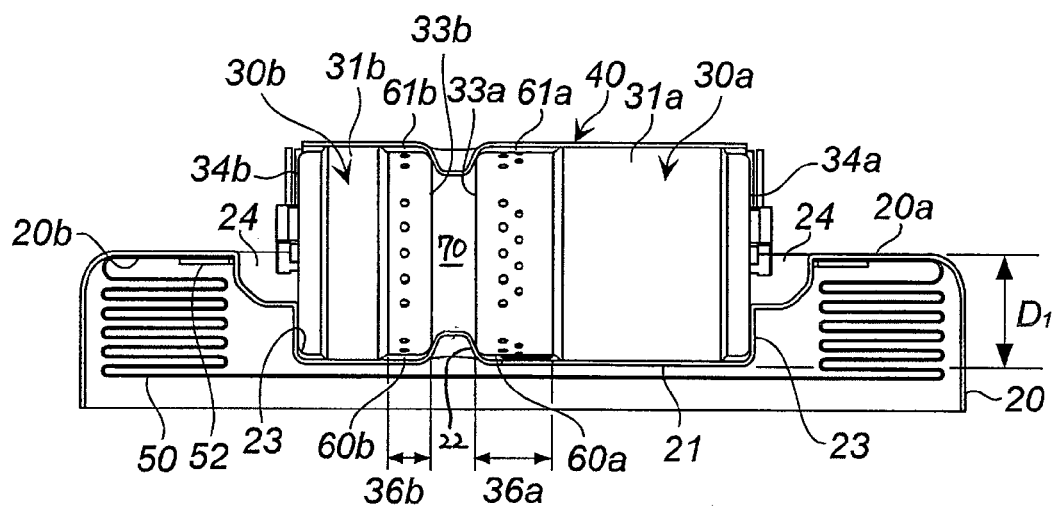
FIG. 2 is a side view of the air bag apparatus assembled from a state shown in FIG. 1.
Figure 3:
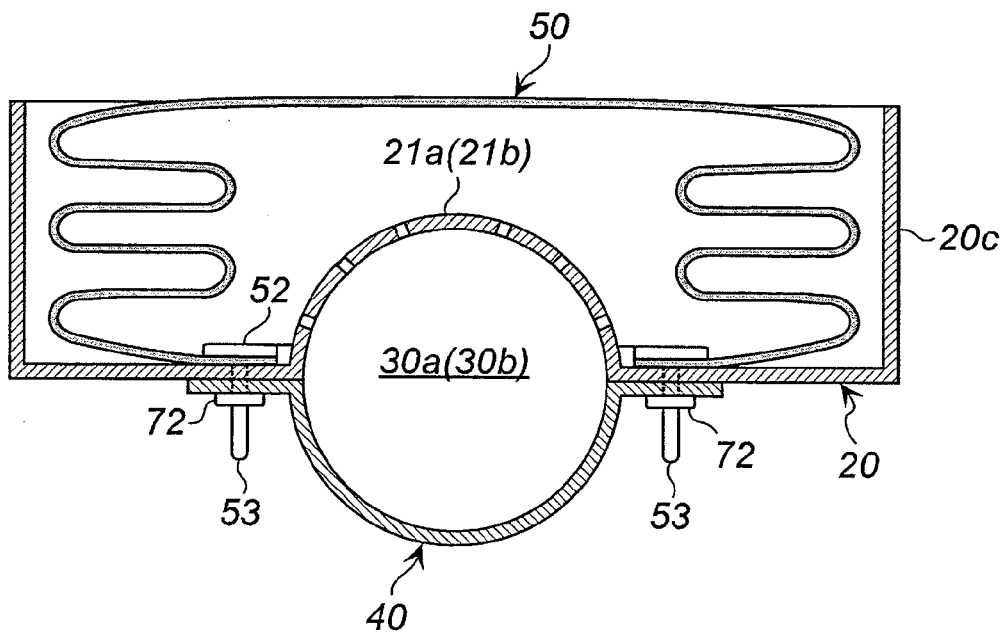
FIG. 3 is a schematic cross-sectional view seen from a widthwise direction of the apparatus of FIG. 2 set upside down.

Embodiments of Invention (1) Air Bag Apparatus of FIG. 1 to FIG. 3

The air bag apparatus of FIG. 1 includes a base plate 20, two gas generators 30a and 30b, a cover member 40, and an air bag 50.

The base plate 20 has a first surface 20a and a second surface 20b on the upper (front) side and the lower (back) side, respectively, in FIG. 1. The base plate 20 further includes four side walls 20c extending in a same direction. The first surface 20a and the second surface 20b are rectangular.

The base plate 20 is depressed from the first surface 20a toward the second surface 20b to form a hollow.

There are a first hollow 21a for receiving a first gas generator 30a, and a second hollow 21b for receiving a second gas generator 30b.

The first hollow 21a and the second hollow 21b have a length and a width corresponding to an axial length and a width (a diameter) of the first gas generator 30a and the second gas generator 30b, respectively, and have the same cross-sectional shape.

The depth (D1) of the first hollow 21a and the second hollow 21b is smaller than the radial width (a diameter D2) of the first gas generator 30a and the second gas generator 30b (D1<D2). Accordingly, when the first gas generator 30a and the second gas generator 30b are fitted in the first hollow 21a and the second hollow 21b, respectively, the first gas generator 30a and the second gas generator 30b protrude from the first surface 20a of the base plate 20.

In the embodiment shown in FIG. 1, the first hollow 21a and the second hollow 21b both have a depth that is equal to the radius of the housings of the first gas generator 30a and the second gas generator 30b, so that each of the radial half for the first gas generator 30a and the second gas generator 30b is fitted in the first hollow 21a and the second hollow 21b, respectively, while each of the remaining half is protruded from the first surface 20a of the base plate 20 (D1=D2/2).

A known gas generator may be used for the first gas generator 30a and the second gas generator 30b fitted in the first hollow 21a and the second hollow 21b.

For example, a pyrotechnic gas generator that generates gas by burning a solid gas generating agent, such as the one shown in JP-A No. 10-315900 (but without the attachment member denoted at 33), may be used.

The first gas generator 30a and the second gas generator 30b, shown in FIG. 1, have the same housing diameter, but different lengths along the direction of the axis X and they are charged with different amounts of a gas generating agent. The first gas generator 30a generates 2.1 moles of gas, while the second gas generator 30b generates 1 mole of gas, i.e., the first gas generator 30a has the larger maximum output pressure.

Each of the first gas generator 30a and the second gas generator 30b has a housing with a columnar outer shape and gas discharge ports 32a and 32b are provided in circumferential walls 31a and 31b of the housings, respectively.

The first gas generator 30a and the second gas generator 30b are coaxially fitted in the first hollow 21a and the second hollow 21b of the base plate 20, with a first end surface 33a of the first gas generator 30a and a first end surface 33b of the second gas generator 30b opposite to each other and a space formed therebetween.

The other end surface (the second end surface 34a), on an opposite side to the first end surface 33a of the first gas generator 30a, has a connecting portion 35 for connecting a connector 90, which is connected to supply an ignition current to the ignition device. Similarly, the opposite end surface (the second end surface 34b) to the first end surface 33b in the second gas generator 30b, has a connecting portion (not shown).

The gas discharge ports 32a of the first gas generator 30a are circumferentially equally spaced in an annular discharge port region 36a of the circumferential wall 31a in the first end surface 33a side. An annular discharge port region 36a, being also the annular region, has a smaller outer diameter than that of the remaining circumferential wall 31a.

The gas discharge ports 32b of the second gas generator 30b are circumferentially equally spaced in an annular discharge port region 36b of the circumferential wall 31b in the first end surface 33b side. The annular discharge port region 36b, being also the annular region, has a smaller outer diameter than that of the remaining circumferential wall 31b.

The number and a position of the gas discharge ports are not particularly limited as long as the present invention is obtained.

In the first hollow 21a of the base plate 20, a first communication hole 25a is formed in a portion corresponding to the discharge port region 36a, to communicate the first surface 20a with the second surface 20b.

In the second hollow 21b of the base plate 20 a second communication hole 25b is formed in a portion corresponding to the discharge port region 36b, to communicate the first surface 20a with the second surface 20b.

Outer diameters of the circumferential wall 31a of the first gas generator 30a and the circumferential wall 31b of the second gas generator 30b are reduced at the discharge port regions 36a and 36b.

Therefore, when the first gas generator 30a is fitted in the first hollow 21a and the second gas generator 30b is fitted in the second hollow 21b, a gap 60a is formed between the discharge port region 36a and the first hollow 21a, and a gap 60b is formed between the discharge port region 36b and the second hollow 21b.

The circumferential walls 31a and 31b except for the discharge port regions 36a and 36b are in contact with the surfaces of the first hollow 21a and the second hollow 21b, respectively.

A protrusion 22, that is circumferentially continuous and protrudes on the first surface 20a, is formed between the first hollow 21a and the second hollow 21b (in a boundary portion).

The first hollow 21a and the second hollow 21b have each a fixing wall surface 23 at an opposite end to the protrusion 22, each fixing wall surface 23 is provided with a recess 24 dented in the axial direction.

When the first gas generator 30a is fitted in the first hollow 21a, the second end surface 34a abuts against the fixing wall surface 23, and when the second gas generator 30b is fitted in the second hollow 21b, the second end surface 34b abuts against the fixing wall surface 23, so that both gas generators are fixed in the respective hollows.

With the first gas generator 30a fitted in the first hollow 21a and the second gas generator 30b fitted in the second hollow 21b as described above, a connecting space is obtained between the second end surface 34a and the recess 24, and between the second end surface 34b and the recess 24. The connecting space formed by these two recesses 24 provides room for accommodating the connectors 90 to be connected to the respective connecting portions 35 of the first gas generator 30a and the second gas generator 30b.

Further, a cover member 40 is attached to cover the first gas generator 30a and the second gas generator 30b fitted in the first hollow 21a and the second hollow 21b, respectively, of the base plate 20.

The cover member 40 encloses the circumferential walls 31a and 31b of the first gas generator 30a and the second gas generator 30b, but it may be attached so as to cover only the respective discharge port regions 36a and 36b of the circumferential walls 31a and 31b.

The cover member 40 has a circumferential surface 41 having a shape corresponding to that of the circumferential walls 31a and 31b of the housings of the first gas generator 30a and the second gas generator 30b, and covers such that the circumferential surface 41 abuts against the circumferential walls 31a and 31b. The circumferential surface 41, which abuts against the circumferential walls 31a and 31b, also serves as a fixing member of the first gas generator 30a and the second gas generator 30b.

However, because the discharge port regions 36a and 36b have a smaller outer diameter than the remaining circumferential walls 31a and 31b, the circumferential surface 41 of the cover member 40 does not contact the discharge port regions 36a and 36b, and there are gaps 61a and 61b therebetween.

The cover member 40 has two end portions 42 at both ends to abut against the second end surfaces 34a and 34b of the first gas generator 30a and the second gas generator 30b, and a protrusion 43 that inwardly protrudes and circumferentially continuous.

In FIG. 1, the first gas generator 30a and the second gas generator 30b are held between the cover member 40 and the base plate 20 such that both first end surfaces 33a and 33b abut against the protrusion 22 and the protrusion 43, so that both generators are retained, with a space 70 therebetween.

Figure 4:
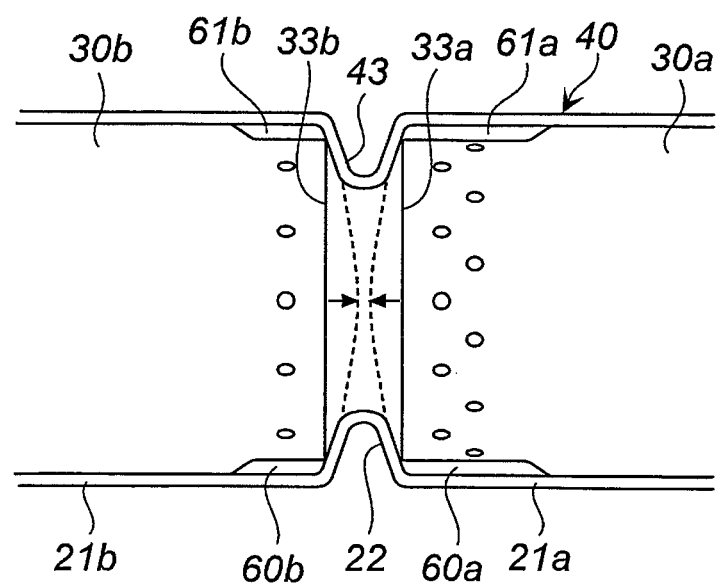
FIG. 4 is a partial enlarged view of the air bag apparatus of FIG. 2.

A widthwise cross-sectional shape of the protrusion 22 formed between the first hollow 21a and the second hollow 21*b*, and a widthwise cross-sectional shape of the protrusion 43 formed in the cover member 40 are a substantive triangular as shown in FIG. 4.

When the first end surface 33*a* of the first gas generator 30*a* and the first end surface 33*b* of the second gas generators 30*b* are deformed upon activation, the deformation is larger in the vicinity of the center. Even if such deformation occurs, when the cross-sectional shape of the protrusions 22 and 43 is a substantive triangular, the first end surfaces 33*a* and 33*b* do not contact the protrusions 22 and 43, as shown in FIG. 4.

If the protrusion 22 or 43 contacts the end surfaces, the base plate 20 will be deformed or the gas generators 30 will be displaced from the base plate 20, but this is prevented in the air bag apparatus of the present invention. Also, when the first gas generator 30*a* is activated, the space 70 prevents the heat from affecting the second gas generator 30*b*, so that a malfunction of the second gas generator 30*b* is prevented.

In the first gas generator 30*a*, a first annular discharge path that leads to the first communication holes 25*a* is formed by the gap 60*a* between the first gas generator 30*a* and the base plate 20, and the gap 61*a* between the first gas generator 30*a* and the cover member 40.

In the second gas generator 30*b*, a second annular discharge path that leads to the second communication holes 25*b* is formed by the gap 60*b* between the second gas generator 30*b* and the base plate 20, and the gap 61*b* between the second gas generator 30*b* and the cover member 40.

The first annular discharge path and the second annular discharge path do not communicate with each other (through the space 70) and are independent from each other, because of the protrusion 22 and the protrusion 43 making contact with circumferences of the first end surfaces 33*a* and 33*b* of the first gas generator 30*a* and the second gas generator 30*b*, respectively.

The cover member 40 includes a fastening portion 44 to be attached to the first surface 20*a* of the base plate 20.

The fastening portion 44 is a flat surface extending from both ends of the semi-cylindrical or semi-circular circumferential surface 41, and includes a plurality of holes 44*a* for bolts to pass through.

In the second surface 20*b* side of the base plate 20 is accommodated an air bag 50 folded and in contact with the second surface 20*b*.

The air bag 50 is attached such that a gas inlet 51 encloses the first hollow 21*a* and the second hollow 21*b*. And the air bag 50 is fixed by an air bag attachment member 52 in the form of a frame having a plurality of bolts 53 and attached at an edge of the gas inlet 51.

The air bag apparatus shown in FIG. 1 to FIG. 3 can be assembled in the following manner, for example. The order of assembling steps is not particularly limited to this example.

First, the air bag attachment member 52 is inserted into the air bag 50, from the gas inlet 51.

Next, the plurality of bolts 53 fixed to the air bag attachment member 52 are passed through a plurality of through holes 55 formed around the gas inlet 51 from inside to outside.

The bolts 53 are then passed through the holes formed in the base plate 20.

Next, the two gas generators (the first gas generator 30*a* and the second gas generator 30*b*) are fitted into the two hollows of the base plate 20 such that their first end surfaces 33*a* and 33*b* face each other. Here, the two gas generators need not be oriented in a particular circumferential direction or positioned relative to each other.

Next, the cover member 40 is placed over the two gas generators, and the bolts 53 are passed through the holes 44*a* formed in the fastening portion 44 of the cover member 40.

After that, the bolts are fastened with nuts 72.

The air bag apparatus of the present invention can be assembled by putting together the components in the order described above, for example, whereby the first gas generator 30*a* and the second gas generator 30*b* are fixed between the base plate 20 and the cover member 40, and in addition, the air bag 50 and the base plate 20 can be fixed together, as shown in FIG. 1 to FIG. 3.

In the assembled air bag apparatus, the first and second gas discharge paths of the first gas generator 30*a* and the second gas generator 30*b* are connected to the gas inlet 51 of the air bag 50.

Next, the operation of the air bag apparatus shown in FIG. 1 will be described with reference to FIG. 1 to FIG. 3.

When an impact is detected, the air bag apparatus can be worked in five manners according to the level of impact, in which:

(I) The first gas generator 30*a* only is activated;
(II) The second gas generator 30*b* only is activated;
(III) The first gas generator 30*a* is activated first, and then the second gas generator 30*b* is activated;
(IV) The second gas generator 30*b* is activated first, and then the first gas generator 30*a* is activated; and
(V) The first gas generator 30*a* and the second gas generator 30*b* are activated at the same time.

The operation in mode (III) will be described below as one example.

When an ignition current is applied via the connector 90 to an ignition device of the first gas generator 30*a*, the ignition device activates the first gas generator 30*a* to generate a predetermined amount of combustion gas.

The combustion gas flows from the gas discharge ports 32*a* through the annular gaps 60*a* and 61*a* defined by the cover member 40 (the circumferential surface 41), the discharge port region 36*a*, and protrusions 22 and 43, and reaches the first communication holes 25*a*.

The gas is then discharged through the first communication holes 25*a* and the gas inlet 51 into the air bag 50 to inflate the air bag 50.

Then, the second gas generator 30*b* is activated with a delay by an ignition current applied to the igniter of the second gas generator 30*b*, so that combustion gas is discharged from the gas discharge ports 32*b*, flows through the annular gaps 60*b* and 61*b* formed by the cover member 40 (the circumferential surface 41), the discharge port region 36*b*, and protrusions 22 and 43, and reaches the second communication holes 25*b*.

The gas is then discharged through the gas inlet 51 into the air bag 50 to further inflate the air bag 50.

The housing of the first gas generator 30*a* that is activated first becomes very hot due to the heat generated upon activation.

In some cases, the end surface (the first end surface 33*a*) may deform outwardly (toward the second gas generator 30*b*) because of the pressure inside the housing.

However, in the air bag apparatus of the present invention, since the space 70 is formed between the first end surface 33*a* of the first gas generator 30*a* and the first end surface 33*b* of the second gas generator 30*b*, the end surface 33*a* does not contact the end surface 33*b*.

In the air bag apparatus shown in FIG. 1 to FIG. 3, when the first gas generator 30*a* and the second gas generator 30*b* both have a housing diameter (an outer diameter) of 60 mm, a width of the space 70 may be set in a range of 6 to 120 mm.

The width of the space 70 is preferably be within the range of 0.3 to 1 times the above outer diameter, i.e., in this case, the width of the space is preferably be 18 to 60 mm.

With such a space 70 having a predetermined width, even if the first end surface 33a of the first gas generator 30a deforms after the activation, it does not contact the first end surface 33b of the second gas generator 30b, so that the second gas generator 30b is prevented from being thermally affected. Similarly, even if the first end surface 33b of the second gas generator 30b deforms after the activation, it does not contact the first end surface 33a of the first gas generator 30a.

Therefore, the base plate 20 is not deformed, so that the first gas generator 30a and the second gas generator 30b are unlikely to be displaced to narrow or block the gas discharge paths.

Figure 5:
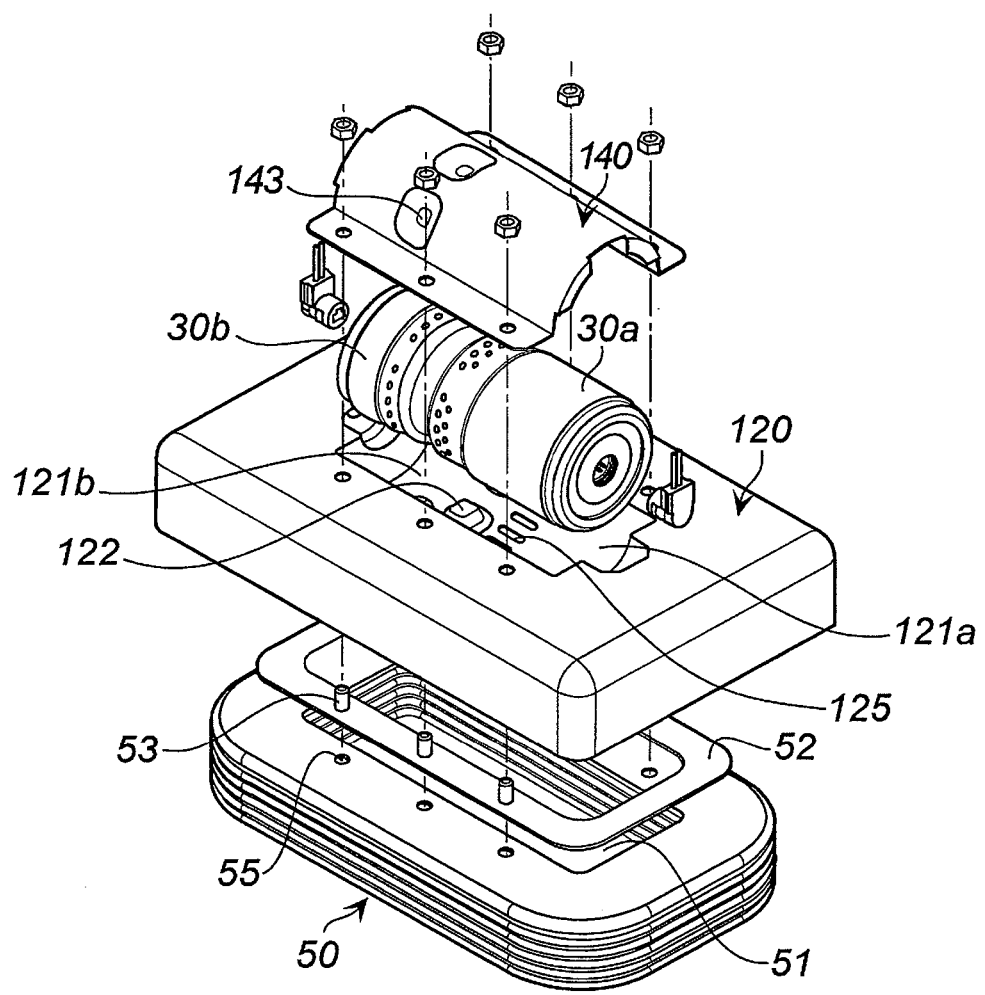
FIG. 5 is an exploded perspective view of an air bag apparatus in another embodiment which is different from that in FIG. 1 (perspective view for explaining how the apparatus is assembled)
Figure 6:
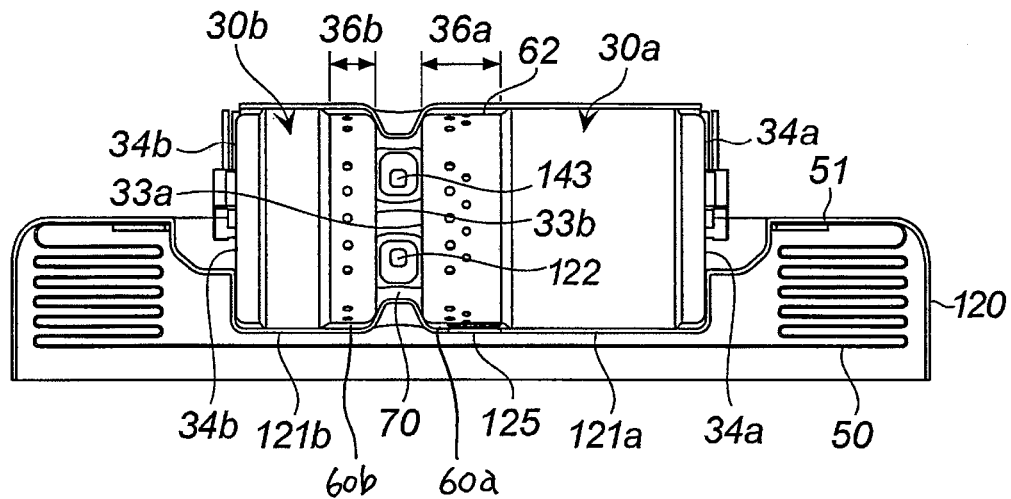
FIG. 6 is a side view of the air bag apparatus assembled from a state shown in FIG. 4.

(2) Air Bag Apparatus of FIG. 5 and FIG. 6

The first gas generator 30a and the second gas generator 30b used in the air bag apparatus of FIG. 5 and FIG. 6 are the same as those shown in FIG. 1, but the base plate 20 and the cover member 40 are partly different.

The different parts will be mainly described below. The same components are denoted with the same reference numerals as those in FIG. 1.

The base plate 120 includes a first hollow 121a for receiving the first gas generator 30a, and a second hollow 121b for receiving the second gas generator 30b.

A plurality of communication holes 125 are formed in the circumferential direction in the first hollow 121a. The communication holes 125 are formed at a position corresponding to the center of the gas inlet 51 of the air bag 50.

The base plate 120 is formed with a plurality of independent protrusions 122.

The cover member 140 is formed with a plurality of independent protrusions 143.

Therefore, while the protrusions 122 and the protrusions 143 are in contact with the first end surface 33a and the first end surface 33b, the base plate 120 and the cover member 140 do not contact the first end surface 33a and the first end surface 33b where there are no protrusions 122 and protrusions 143.

In the air bag apparatus shown in FIG. 5 and FIG. 6, the space 70 between the first gas generator 30a and the second gas generator 30b communicates with the annular gaps 60a and 61a, and with the annular gaps.

In the air bag apparatus shown in FIG. 5 and FIG. 6, combustion gas generated from the first gas generator 30a flows from the first discharge port region 36a and is introduced into the air bag 50 through the communication holes 125. Part of gas flows through the annular gaps 60a and 61a into the space 70 before entering the air bag 50.

On the other hand, the combustion gas discharged from the second gas generator 30b flows through the annular gaps 60b and 61b into the space 70.

The combustion gas then flows into the annular gaps 60a and 61a, before it is discharged into the air bag 50 through the communication holes 125.

In the air bag apparatus shown in FIG. 5 and FIG. 6, as the communication holes 125 are formed to be positioned at the center of the gas inlet 51, the air bag 50 can be inflated uniformly upon activation. As the air bag 50 is deployed uniformly, it provides enhanced occupant restraint performance.

Figure 7:
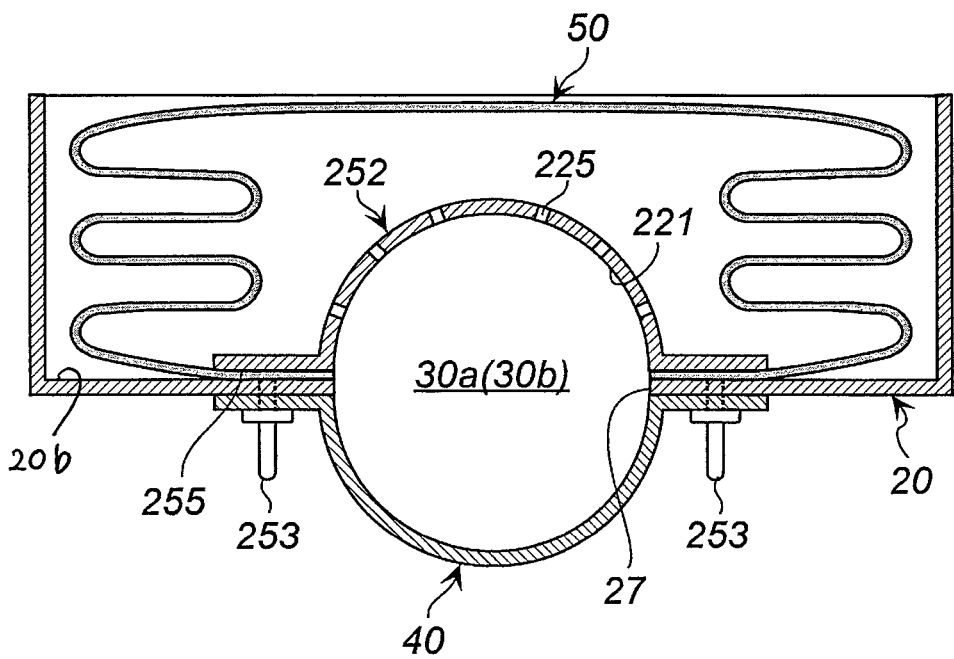
FIG. 7 is a schematic cross-sectional view seen from a widthwise direction of an air bag apparatus in yet another embodiment.

(3) Air Bag Apparatus of FIG. 7

The air bag apparatus of FIG. 7 is different from the air bag apparatus of FIG. 1 to FIG. 3 in that a retainer for an air bag and the gas generators is used in addition to the base plate and the cover member in order to retain the gas generators. FIG. 7 is a drawing that corresponds to FIG. 3.

The differences from the air bag apparatus of FIG. 1 to FIG. 3 will be mainly described below. The reference numerals denoted the same as those in FIG. 1 to FIG. 3 refer to the same components.

In the air bag apparatus of FIG. 7, an opening 27 is formed in a portion corresponding to the hollows of the base plate 20 in FIG. 1.

The first gas generator 30a and the second gas generator 30b are fitted in the opening 27.

The opening 27 has an axial length and a width that can accommodate the first gas generator 30a and the second gas generator 30b.

An air bag retainer 252 of the base plate 20 is disposed on the second surface 20b side.

The retainer 252 includes a flat plate portion 255 and a hollow (a first hollow and a second hollow) 221 formed in one side of the flat plate portion 255, and the hollow 221 is provided with a plurality of communication holes 225.

A bolt 253 that is the same as the bolt 53 in FIG. 1 is fixed to the flat plate portion (where there is no hollow) 255 in the retainer 252.

The same protrusion as the protrusion 22 in FIG. 1 may be formed in the hollow of the retainer 252.

The flat plate portion 255 corresponds to the bottom surface (the first surface 20a and the second surface 20b) of the base plate 20 in FIG. 1, and the hollow (the first hollow and the second hollow) 221 is the same as the first hollow 21a and the second hollow 21b formed in the bottom surface of the base plate 20 in FIG. 1.

The communication holes 225 are formed at two locations in the hollow 221 of the retainer, as in the first communication holes 25a and the second communication holes 25b in FIG. 1.

The first gas generator 30a and the second gas generator 30b are fitted in the hollow (the first hollow and the second hollow) 221 of the retainer 252 from the opening 27 in the base plate 20.

The cover member 40 is the same one as that shown in FIG. 1 and covers the first gas generator 30a and the second gas generator 30b as shown in FIG. 1.

The cover member 40 includes the same protrusion 43 as that shown in FIG. 1 to maintain the space 70 between the first gas generator 30a and the second gas generator 30b.

The air bag apparatus shown in FIG. 7 can be assembled in the following manner, for example. The assembling procedure will be described with reference also to FIG. 1. The order of assembling steps is not particularly limited to this example.

First, the air bag retainer 252 is inserted into the air bag 50, from the gas inlet 51.

Next, the plurality of bolts of the air bag retainer 252 are passed through the plurality of through holes 55 formed around the gas inlet 51 from inside to outside.

The bolts are then passed through the holes formed in the base plate 20.

Next, the two gas generators (the first gas generator 30a and second gas generator 30b) are fitted into the hollow formed by the opening in the base plate 20 and the air bag retainer 252 such that their first end surfaces 33a and 33b face each other. Here, the two gas generators need not be oriented in a particular circumferential direction or positioned relative to each other.

Next, the cover member 40 is placed over the two gas generators, and the bolts are passed through the holes formed in the fastening portion 44 of the cover member 40.

After that, the bolts are fastened with nuts 72.

In the thus assembled air bag apparatus, as shown in FIG. 7, the two gas generators (the first gas generator 30a and the second gas generator 30b) are fixed between the retainer 252, the base plate 20 and the cover member 40, and in addition, the air bag 50 and the base plate 20 are fixed together. The first and second gas discharge paths of the two gas generators (the first gas generator 30a and the second gas generator 30b) are connected to the gas inlet 51 of the air bag 50. In the embodiment of FIG. 7, the protrusions 22 and 43 may be shaped, and the communication holes 225 may be positioned in a similar manner with the embodiment shown in FIG. 5 and FIG. 6.

The air bag apparatus of FIG. 7 operates similarly to the air bag apparatus shown in FIG. 1 to FIG. 3.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:
1. An air bag apparatus, comprising:
a base plate;
gas generators including a first gas generator and a second gas generator, fixed to a first side of the base plate;
a cover member covering the gas generators, the cover member facing the first side of the base plate; and
an air bag accommodated in contact with the base plate;
the base plate having a hollow formed in the first side of the base plate and provided with a communication hole,
the gas generators being arranged in the hollow and opposing end surfaces of adjacent gas generators defining a space therebetween, and a first gap, for communicating with the communication hole, is formed between the hollow and a gas discharge port of the respective gas generators,
the cover member covering the adjacent gas generators and defining a second gap, in communication with the first gap, between the cover member and the gas discharge port of the respective gas generators,
the air bag being accommodated such that a gas inlet thereof encloses the communication hole in the hollow from a second side, opposite to the first side, of the base plate,
the air bag, the base plate and the cover member being integrally fixed by fastening, with a fastening member, the base plate, the cover member and a frame shaped air bag attachment member which is arranged to abut against the gas inlet in an inside of the airbag,
the adjacent gas generators being fixed by the hollow of the base plate and the cover member, and
a sealed gas discharge path being formed by the first and second gaps defined by the cover member and the base plate, and leading gas from each gas discharge port of the adjacent gas generators to the gas inlet of the air bag.
2. The air bag apparatus according to claim 1, wherein
each of the adjacent gas generators has a columnar outer shape and a plurality of gas discharge ports in an annular region on a circumferential surface near one end surface, and the circumferential surface in the annular region provided with the gas discharge ports has a smaller outer diameter than that of circumferential surfaces of the remaining portion,
the adjacent gas generators are disposed in the hollow of the base plate with the space therebetween, such that the end surfaces, on the side where the plurality of gas discharge ports are provided, face each other,
the base plate, the adjacent gas generators, and the cover member are disposed such that the first and second gaps form an annular gap between the circumferential surface of the annular region provided with the gas discharge ports and an inner surface of the cover member, and between the circumferential surface of the annular region provided with the gas discharge ports and a surface of the hollow of the base plate, and
the annular gap communicates with the communication hole formed in the hollow of the base plate, thereby forming the gas discharge path.
3. The air bag apparatus according to claim 2, wherein
the space between the opposing end surfaces of the adjacent gas generators has a distance of 0.1 to 2 times an outer diameter of the adjacent gas generators.
4. The air bag apparatus according to claim 1, further comprising:
at least one of a protrusion protruding in the hollow of the base plate and a protrusion protruding from the inner surface of the cover member,
the protrusion being positioned in the space between the adjacent gas generators and abutted against the adjacent gas generators.
5. The air bag apparatus according to claim 2, further comprising:
at least one of a protrusion protruding in the hollow of the base plate and a protrusion protruding from the inner surface of the cover member,
the protrusion being wider in a bottom side than in a top side thereof,
the protrusion being positioned in the space between the adjacent gas generators and abutted against the adjacent gas generators, and
the annular regions of the adjacent gas generators, or the annular gaps thereof being communicated with each other.
6. An air bag apparatus comprising:
a base plate having an opening;
gas generators;
a cover member covering the gas generators;
an air bag accommodated in contact with the base plate; and
a retainer for retaining the air bag and the gas generators,
the retainer including a flat plate portion and a hollow formed in one side of the flat plate portion, the hollow being provided with a plurality of communication holes,
the gas generators being arranged, with a space therebetween, defined by opposing end surfaces of adjacent gas generators, inside the opening of the base plate and in the hollow of the retainer, and having a first gap for communicating with a communication hole between the hollow and a gas discharge port of the respective gas generators,
the cover member covering the adjacent gas generators such as to form a second gap, in communication with the first gap, between the cover member and the gas discharge port of the respective gas generators,
the retainer being inserted into the air bag from an gas inlet of the air bag, and disposed such that the flat plate portion abuts against the gas inlet in an inside of the airbag,
the retainer, the air bag, the base plate and the cover member being integrally fixed by a fastening member, the adjacent gas generators being fixed by the hollow of the retainer, the opening of the base plate and the cover member, a sealed gas discharge path, including the first and second gaps, being formed by the cover member, the base plate and the retainer, and leading gas from the gas discharge port of the adjacent gas generators to the gas inlet of the air bag.

7. The air bag apparatus according to claim 3, further comprising:
at least one of a protrusion protruding in the hollow of the base plate and a protrusion protruding from the inner surface of the cover member,
the protrusion being wider in a bottom side than in a top side thereof,
the protrusion being positioned in the space between the adjacent gas generators and abutted against the adjacent gas generators, and
the annular regions of the adjacent gas generators, or the annular gaps thereof being communicated with each other.

\* \* \* \* \*